(12) United States Patent
Iwabuchi

(10) Patent No.: US 6,396,658 B1
(45) Date of Patent: May 28, 2002

(54) MEDIA CARTRIDGE MAGAZINE INCLUDING STRUCTURE FOR LATCHING CARTRIDGES INSERTED INTO THE MAGAZINE

(75) Inventor: Masanori Iwabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 79 days.

(21) Appl. No.: 09/597,487

(22) Filed: Jun. 19, 2000

(30) Foreign Application Priority Data

Jun. 18, 1999 (JP) .......................................... 11-172630

(51) Int. Cl.$^7$ .............................................. G11B 15/68
(52) U.S. Cl. ...................................... 360/92; 360/98.06
(58) Field of Search ............................... 360/92, 98.06; 369/34–36, 38

(56) References Cited

U.S. PATENT DOCUMENTS

| | | | |
|---|---|---|---|
| 5,532,888 A | * | 7/1996 | Acosta et al. .................. 360/92 |
| 5,576,911 A | * | 11/1996 | Porter ...................... 360/98.06 |
| 5,867,458 A | * | 2/1999 | Barkley et al. ................ 369/36 |
| 6,042,205 A | * | 3/2000 | Coffin et al. .............. 312/332.1 |
| 6,088,189 A | * | 7/2000 | Utsumi et al. ................. 360/92 |
| 6,144,520 A | * | 11/2000 | Yamakawa et al. ............ 360/92 |
| 6,236,530 B1 | * | 5/2001 | Schneider et al. ............. 360/92 |
| 6,266,316 B1 | * | 7/2001 | Luffel et al. ................. 369/178 |

FOREIGN PATENT DOCUMENTS

JP          2001-52398    *  2/2001

* cited by examiner

Primary Examiner—Jefferson Evans
(74) Attorney, Agent, or Firm—Young & Thompson

(57) ABSTRACT

A media cartridge magazine that accommodates a plurality of cartridges. In the state where a cartridge is not inserted into a main body of the magazine, a lever is freely and pivotally supported by a rotating shaft. Since a leaf spring connected with the lever and having a claw at an end thereof can move freely in a disengaging direction, the cartridge is not interrupted during its insertion into the main body. When the cartridge is inserted into the main body, an end of the lever is pushed by the rear end of the cartridge that is inserted into the main body. The claw is pressed against the cartridge by the leaf spring and engages a concave portion of the cartridge. In this state, the cartridge is clamped by the leaf spring so that the cartridge is stably accommodated. Since a nearly perpendicular surface of the claw is substantially parallel or acute to a perpendicular surface of the concave portion, the claw is not disengaged from the concave portion by an external event, such as a shock. Therefore, the cartridge is stably maintained in the body during the occurrence of the external event.

10 Claims, 4 Drawing Sheets

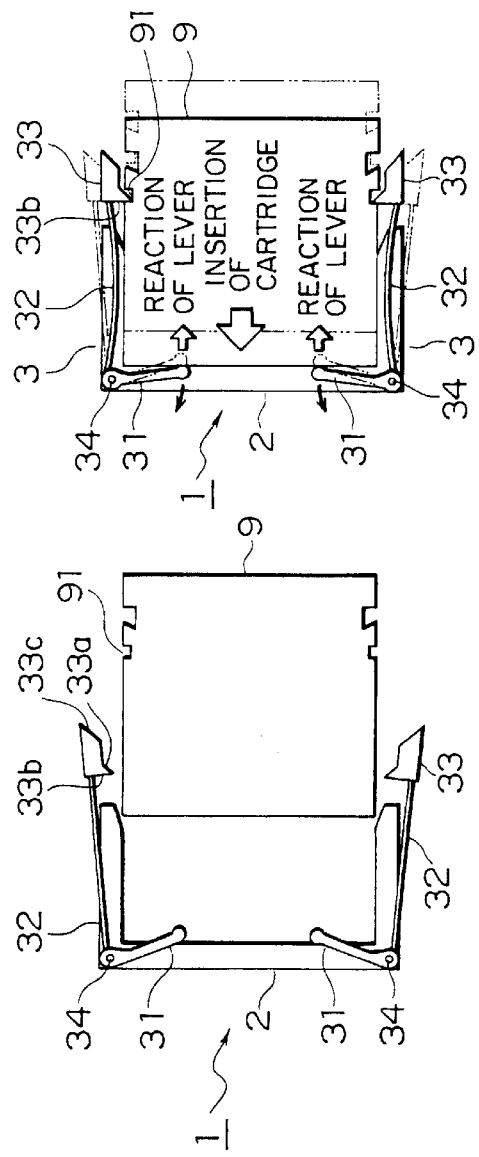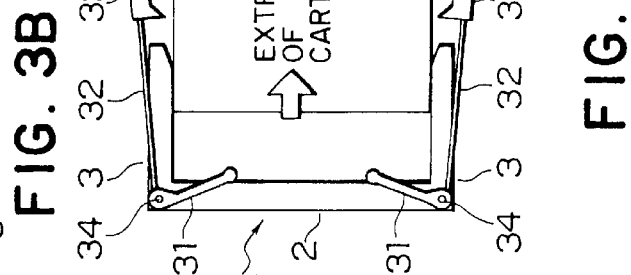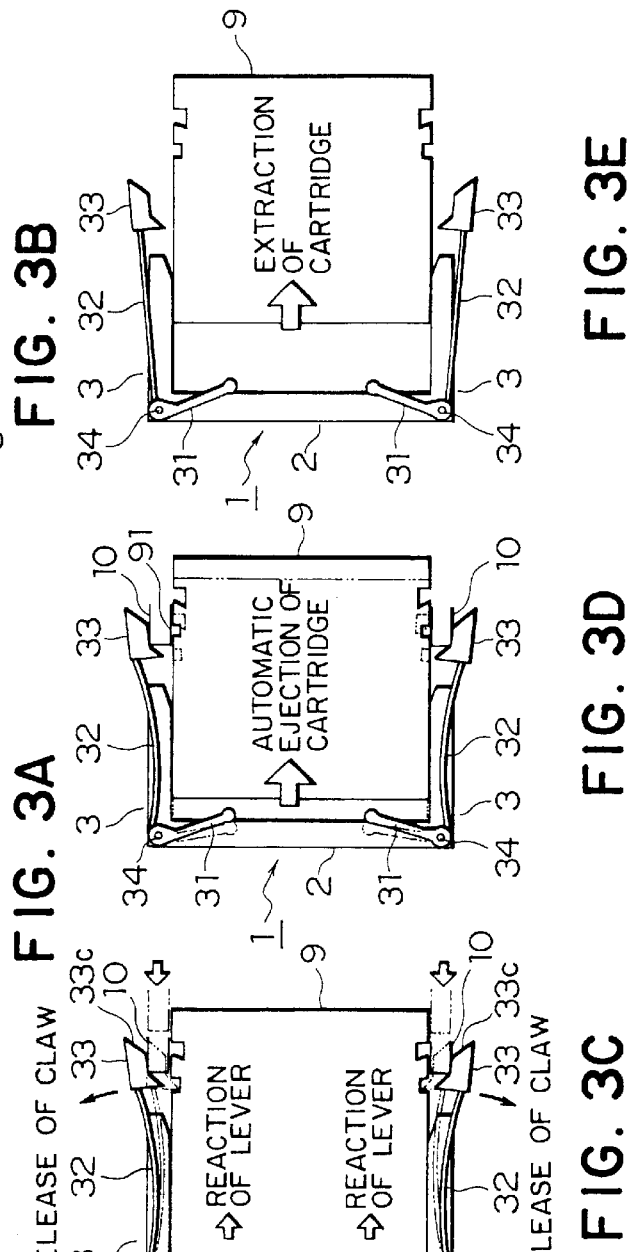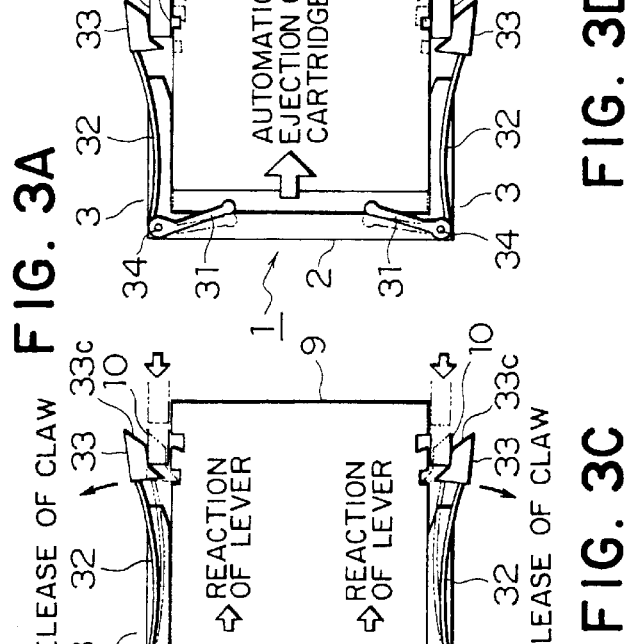

MEDIA CARTRIDGE MAGAZINE INCLUDING STRUCTURE FOR LATCHING CARTRIDGES INSERTED INTO THE MAGAZINE

BACKGROUND OF THE INVENTION

This invention relates to a magazine which accommodates a plurality of cartridges used in recording and reproducing apparatus. In particular, this invention is concerned with the magazine which accommodates the cartridges used in a magnetic recording tape apparatus library (will be called "an MT library" hereafter).

A conventional magazine which accommodates a plurality of cartridges used in recording and reproducing apparatus will be explained taking the case of a magazine for magnetic recording tape cartridges (will be called "cartridges" hereafter) which are used in the MT library.

In the conventional MT library, a magazine which accommodates several cartridges is generally used in order to exchange and manage the cartridges with ease. In the magazine, a single cartridge can be installed and removed by means of a pick-put mechanism which is a cartridge-conveyance mechanism in the MT library or manual operation, and further, the magazine can be installed and removed as one unit. Generally speaking, the cartridges are frequently managed as one magazine unit, for example, seven magazines are used in order to record the data for a week. That is to say, the magazines are installed and removed and also conveyed every week. Therefore, as stated above, maintaining the cartridges in each magazine requires both a function which can easily install and remove the cartridges by means of the manual operation or of the pick-put mechanism, and a function which stably maintains the cartridges so that the cartridges will not come off at the time of the magazine's conveyance, et cetera.

There are two types of the magazines in the conventional MT library as described hereinbelow. A first type of magazine has a locking mechanism which locks the cartridges only at the time of the magazine's conveyance and which is disengaged by means of a lever etc. when the magazine is mounted. The first type of magazine also has a latching mechanism which temporarily maintains the cartridges so that the cartridge will not come off even if the locking mechanism is disengaged. Another magazine in the conventional MT library has a latching mechanism which latches the cartridges by considerably strong force without a locking mechanism.

SUMMARY OF THE INVENTION

It is therefore an object of this invention to provide a magazine accommodating a plurality of cartridges used in recording and reproducing apparatus and magnetic recording tape apparatus library which prevents the cartridges from unnecessary disengagement and which functions to stably insert and eject the cartridges.

It is another object of this invention to provide a magazine with a simple, inexpensive, and reliable structure.

Other objects of this invention will become clear as the description proceeds.

In accordance with an aspect of this invention, there is provided a magazine accommodating a plurality of cartridges used in recording and reproducing apparatus, the magazine comprising: a main body accommodating each of the cartridges so as to be capable of insertion and withdrawal; each of a plurality of levers whose end is rotatably installed at the main body and the other end is brought into contact with an end surface in the direction of insertion and withdrawal of each of the cartridges which is inserted into the main body; each of a plurality of springs which is installed at the other end of each of the levers and is situated along a side surface of each of the cartridges; and each of a plurality of claws which is installed at each of the springs and locks each of the cartridges by insertion into a concave portion formed on the side surface of each of the cartridges when each of the cartridges has been inserted into the predetermined position in the main body.

In accordance with another aspect of this invention, there is provided a magazine accommodating a plurality of cartridges used in magnetic recording tape apparatus library, the magazine comprising: a main body accommodating each of the cartridges so as to be capable of insertion and withdrawal; each of a plurality of levers whose end is rotatably installed at the main body, the other end is brought into contact with an end surface in the direction of insertion and withdrawal of each of the cartridges which is inserted into the main body; each of a plurality of springs which is installed at the other end of each of the levers and is situated along a side surface of each of the cartridges; and each of a plurality of claws which is installed at each of the springs and locks each of the cartridges by insertion into a concave portion formed on the side surface of each of the cartridges, when each of the cartridges has been inserted into the predetermined position in the main body.

BRIEF DESCRIPTION OF THE DRAWINGS

FIGS. 3A–3E are sectional views which show motion of the disengagement preventing mechanism of the magazine according to the first embodiment of this invention.

DESCRIPTION OF THE PREFERRED EMBODIMENTS

Figure 1:
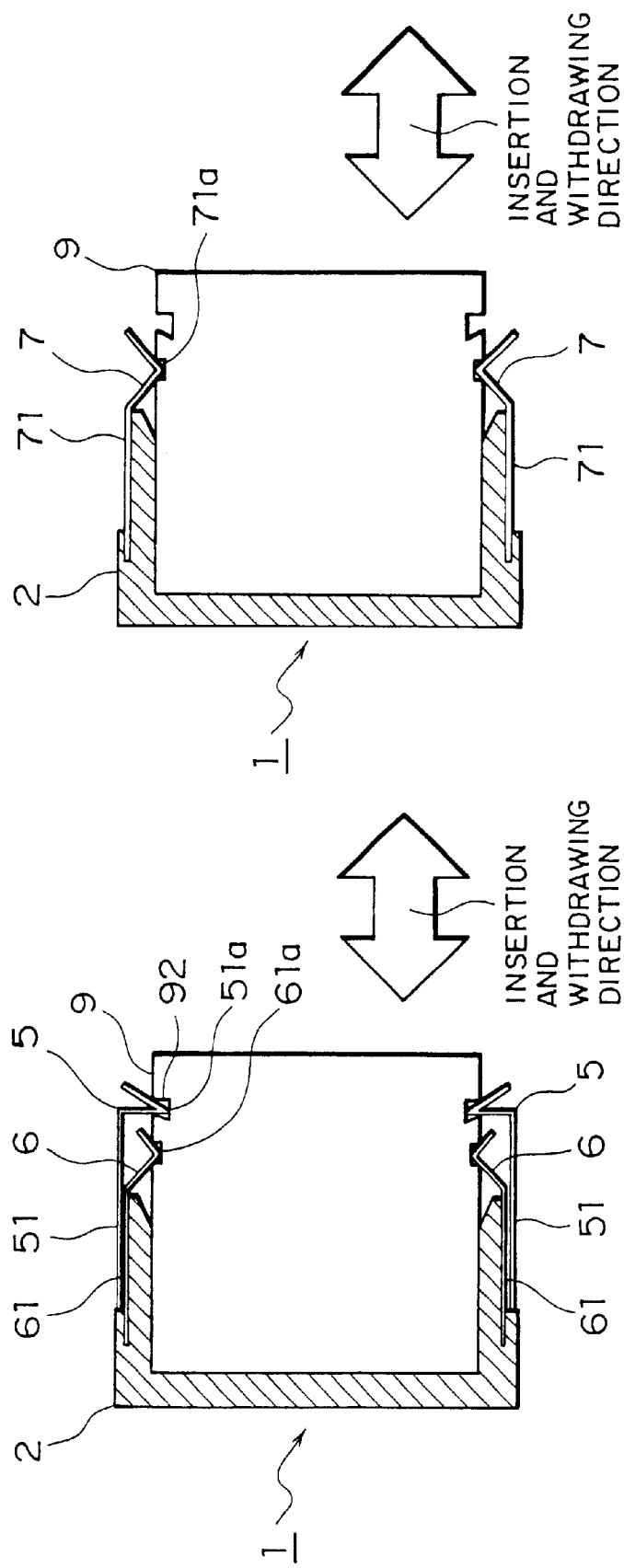
FIG. 1A is a sectional view of a first conventional magazine.
FIG. 1B is a sectional view of a second conventional magazine.

Referring to FIGS. 1A and 1B, two conventional magazines accommodating a plurality of cartridges used in recording and reproducing apparatus, respectively, will be described in order to facilitate an understanding of this invention.

FIG. 1A shows a disengagement preventing mechanism of the magazine which has both a locking mechanism and a latching mechanism separately.

A magazine 1 has a pair of locking mechanisms 5 which prevents a cartridge 9 from disengaging at the time of its conveyance and a pair of latching mechanisms 6 which latches temporarily at both sides of a main body 2 thereof. The single locking mechanism and the single latching mechanism will be described in order to simplify an explanation hereafter.

The locking mechanism 5 is constituted of a locking spring 51 made of a leaf spring. The latching mechanism 6 is constituted of a latching spring 61 made of a leaf spring. In the disengagement preventing mechanism of the magazine of the type as mentioned above, an acute claw 51a of the locking spring 51 engages perfectly into a concave portion 92 of the cartridge 9. Therefore, even if the cartridge 9 is forced to move to an ejecting direction, it can not be ejected from the main body 2 because the locking mechanism 5 is not released. Consequently, when the locking spring 51 is bent to the direction apart from the cartridge 9 by an automatic means at the stage of mounting of the magazine 1 to the MT library (not shown) or by another mechanism (not shown) at the stage of ejecting of the cartridge 9 from the main body 2, the cartridge 9 is generally released from the main body 2. After the locking mechanism 5 is released, the latching mechanism 6 having a latching force which can prevent the cartridge 9 from shifting in the main body 2 temporarily latches the cartridge 9. As a result, the cartridge 9 is prepared for conveyance. However, the latching force of the latching mechanism 6 which is generated by the latching spring 61 should not be a large enough force to have an influence on the conveyance of the cartridge 9. Accordingly, generally speaking, the latching force of the latching mechanism 6 is not greater than twice as much of the weight of the cartridge 9. Since an end portion 61a of the latching spring 61 has an obtuse curved surface, the cartridge 9 is easily ejected from the main body 2 when the magazine 1 is given a shock from the exterior. An undesirable ejection of the cartridge 9 from the main body 2 is a cause for concern. Further, the latching mechanism 6 always presses the end portion 61a against the cartridge 9 by the latching spring 61. Therefore, when there are another grooves or concave portions at the side surface of the cartridge 9, the cartridge 9 can not be ejected smoothly from the main body 2 and the end portion 61a is defaced. As a result, the reliability of the disengagement preventing mechanism of the magazine declines remarkably over time.

FIG. 1B shows a disengagement preventing mechanism of the magazine which serves both as a locking mechanism and an ordinary latching mechanism by a locking mechanism 7 having latching force slightly stronger than the ordinary latching force. The locking mechanism 7 is installed at both sides of a main body 2 of a magazine 1. The latching mechanism 7 is constituted of a latching spring 71 made of a leaf spring. In this case, the latching spring 71 is generally set up several times stronger than the latching spring 61 shown in FIG. 1A. However, the latching force of the latching mechanism 7 must be set within the range such that the pick-put mechanism can perform disengagement. Therefore, it goes without saying that the latching force has a limit. Generally speaking, when the latching force of the latching mechanism 7 is sufficiently strong, the latching mechanism 7 can not be disengaged by the pick-put mechanism, and besides, when the latching mechanism 7 can be disengaged by the pick-put mechanism, the latching force thereof is not sufficiently strong.

And further, an end portion 71a of the latching spring 71 is always pressed against the cartridge 9 in the disengagement preventing mechanism. As a result, since the end portion 71a is unnecessarily engaged with the concave portion 91 of the cartridge 9, the cartridge 9 can not be ejected smoothly from the main body 2 and the end portion 71a defaces. Consequently, the reliability of the disengagement preventing mechanism of the magazine declines remarkably. Thus the problems in the disengagement preventing mechanism of the magazine are not yet resolved. Considering that the pressing force of the latching mechanism 7 is several times stronger than that of the latching mechanism 6, the above-mentioned problems are very serious.

Figure 2:
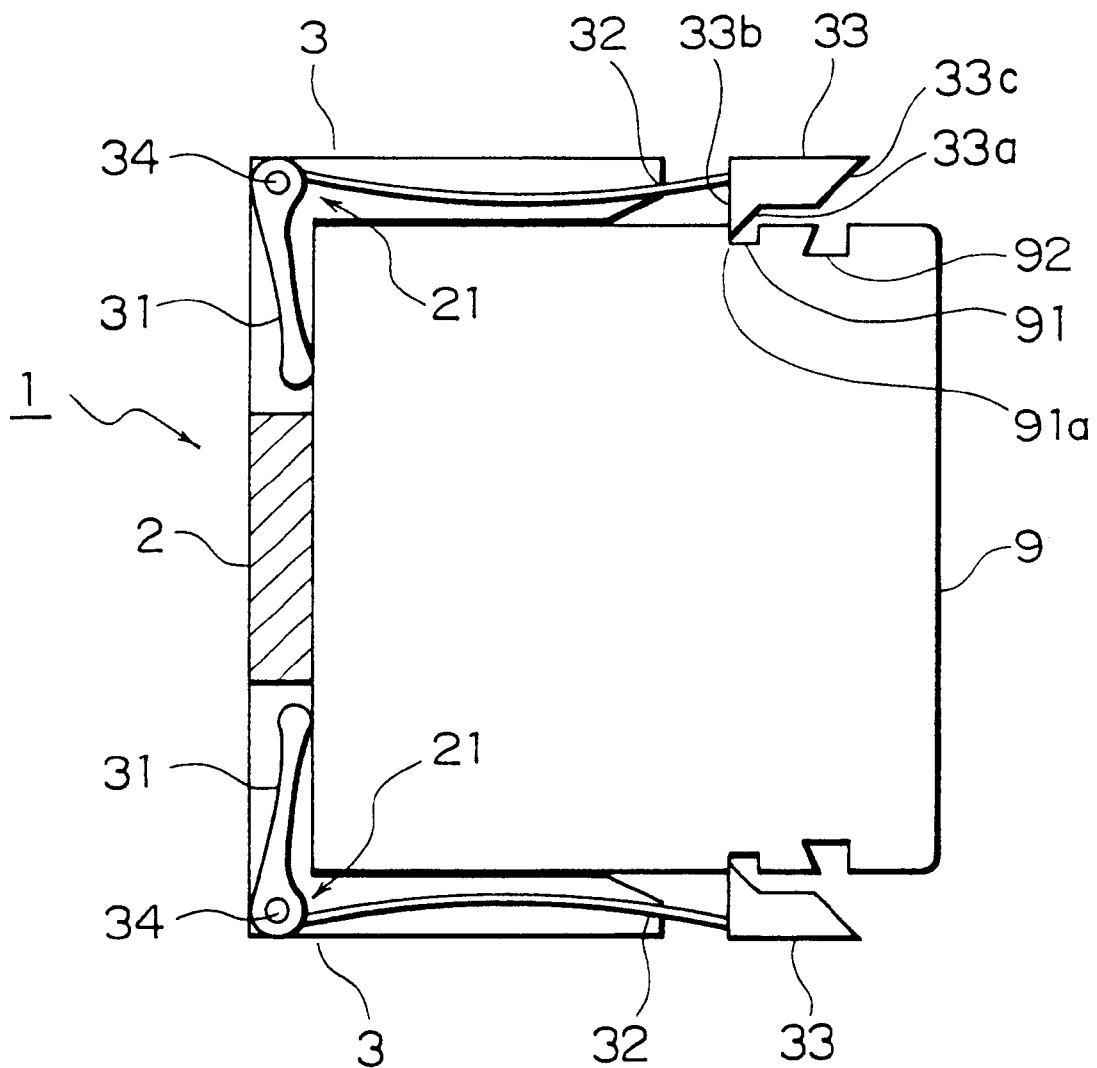
FIG. 2 is a sectional view of a disengagement preventing mechanism of a magazine according to a first embodiment of this invention.

Referring to FIGS. 2 to 3E, the description will proceed to a disengagement preventing mechanism of a magazine according to a first preferred embodiment of this invention.

FIG. 2 is a sectional view of the magazine. The magazine 1 consists of a main body 2 of the magazine 1 and a disengagement preventing mechanism 3.

The main body 2 has a box-like shape and accommodates a plurality of cartridges 9 which are used in the MT library (not shown). The cartridges 9 are inserted into and ejected from the main body 2. The main body 2 is equipped with a pair of grooves 21 which correspond to each side of the cartridges 9. Each of the grooves 21 receives the disengagement preventing mechanism 3, respectively.

The disengagement preventing mechanism 3 serves both as the locking mechanism 5 and the latching mechanism 6 shown in FIG. 1A. For purpose of simplification of an explanation, a single disengagement preventing mechanism will be described hereafter. The disengagement preventing mechanism 3 consists of a lever 31, a leaf spring 32, a claw 33, and a rotating shaft 34.

An end of the lever 31 is pivotally supported by the rotating shaft 34 in the groove 21 of the main body 2. The other end of the lever 31 is adapted to be brought into contact with a rear end surface of the cartridge 9 which is inserted into a predetermined position in the main body 2.

The leaf spring 32 is connected with the other end of the lever 31 and extends along a side surface of the cartridge 9 to a front end of the cartridge 9. The leaf spring 32 of this embodiment is formed as a plate-like shape, a bar-like shape, etc..

The claw 33 is connected with an end of the leaf spring 32. When the cartridge 9 is inserted into the predetermined position in the main body 2, the claw 33 is introduced into a concave portion 91 which is formed at a side end of the cartridge 9 so as to lock the cartridge 9 in the state where the cartridge 9 is inserted into the main body 2. An inclined surface 33a and a substantial perpendicular surface 33b, each inclined and perpendicular with respect to the direction in which the cartridge 9 is inserted into and ejected from the main body 2, respectively, are formed at the rear portion of the claw 33. Further, an inclined surface 33c is formed at the front portion of the claw 33.

FIGS. 3A–3E are principle views which show motions of the magazine 1 shown in FIG. 2. FIG. 3A shows the state in which the cartridge 9 is not inserted into the main body 2. FIG. 3B shows the state which the disengagement preventing mechanism of the cartridge 9 operates by insertion of the cartridge 9 into the main body 2. FIG. 3C shows the state which the cartridge 9 is disengaged from locking by the claw 33. FIG. 3D shows the state which the cartridge 9 is automatically ejected from the main body 2. FIG. 3E shows the state which the cartridge 9 is extracted from the main body 2 by an operator.

In the state of FIG. 3A, the lever 31 is freely pivotally supported by the rotating shaft 34. Since the leaf spring 32 is connected with the lever 31 and the claw 33 is installed at an end of the leaf spring 32, the leaf spring 32 can move freely to the disengaging direction, without interrupting the insertion of the cartridge 9 into the main body 2.

In the state of FIG. 3B, the end of the lever 31 is pushed by the rear end of the cartridge 9 which is inserted into the main body 2. The claw 33 is pressed against the cartridge 9 by the leaf spring 32 and is engaged to the concave portion 91 of the cartridge 9. In this state, the cartridge 9 is clamped by the leaf spring 32 so that the cartridge 9 is stably accommodated. Since the substantially perpendicular surface 33b of the claw 33 is substantially parallel or acute to a perpendicular surface 91a of the concave portion 91, the claw 33 is not disengaged from the concave portion 91 of the cartridge 9 by an occurrence such as a shock. Therefore, the cartridge 9 is stably maintained in the main body 2.

In the state of FIG. 3C, the force in the bending direction of the leaf spring 32 depends on the elasticity of the leaf spring 32. Accordingly, if the claw 33 can be pushed to the bending direction of the leaf spring 32 by the pick-put mechanism etc., the locking state of the disengagement preventing mechanism 3 can be disengaged with ease. In the case of this embodiment, when the end of a disengagement mechanism 10 pushes the inclined surface 33c of the claw 33, the component force is generated toward the bending direction of the leaf spring 32. As a result, the locking state of the disengagement preventing mechanism 3 can be disengaged.

FIG. 3D shows the state after the disengagement of the locking. Immediately after the lock of the cartridge 9 is disengaged, the leaf spring 32 is still bent. Therefore, the force which pushes the cartridge 9 out of the main body 2 operates the end of the lever 31 connected to the leaf spring 32. Consequently, the cartridge 9 disengaged from the locking is pushed out of the main body 2 at a distance (several millimeters) where the bending of the leaf spring 32 is corrected. As a result, since the concave portion 91 of the cartridge 9 can move at several millimeters from the claw 33, the cartridge 9 is prevented from unnecessary relocking.

FIG. 3E shows motion of the disengagement preventing mechanism 3 of the cartridge 9 at the time of withdrawal. After the disengagement mechanism 10 has been withdrawn from the cartridge 9 and the claw 33, the leaf spring 32 is suddenly released from its bending state, the disengagement preventing mechanism 3 of the cartridge 9 returns to the initial state at which the disengagement preventing mechanism 3 is rotatably maintained. Even if the cartridge 9 is withdrawn out of the main body 2 in this state, the claw 33 does not have a force having a component pushing toward the direction of the cartridge 9. Therefore, the end of the claw 33 will not be brought into contact with the cartridge 9 and is not unnecessarily defaced.

Figure 4:
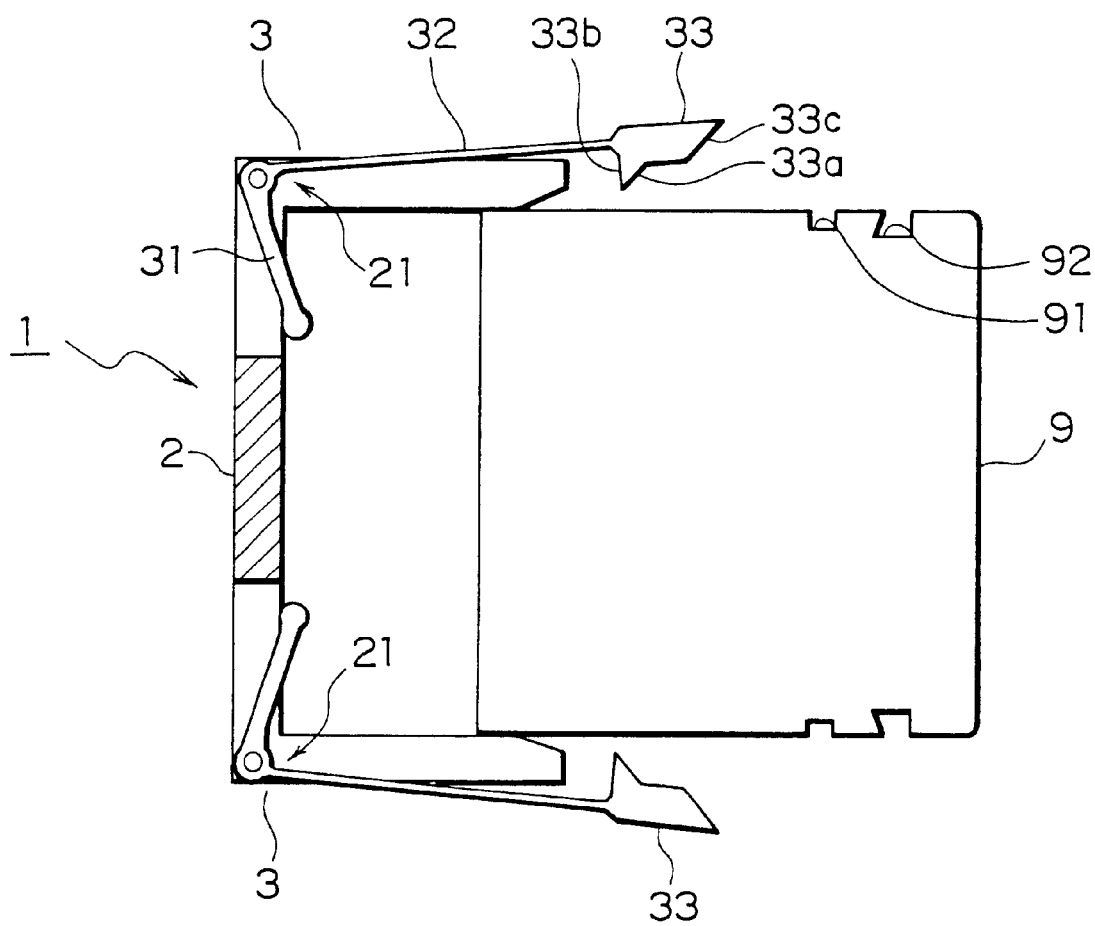
FIG. 4 is a sectional view of a disengagement preventing mechanism of a magazine according to a second embodiment of this invention.

FIG. 4 is a disengagement preventing mechanism of a magazine according to a second preferred embodiment of this invention. The constitution of the second embodiment is similar to that of the first embodiment. Accordingly, a description of the same constitution as of the second embodiment to that of the first embodiment is omitted. The same reference symbols as the first embodiment, and only a partial constitution of the second embodiment that is different from that of the first embodiment will be described.

As described in the first and second embodiments, since the disengagement preventing mechanism of the magazine in the present invention comprises the lever, the leaf spring, and the claw, the following merits are achieved by the present invention.

1. The disengagement preventing mechanism has a steady locking force.

2. The end of claw will not be brought into contact with the cartridge and is not defaced unnecessarily.

3. The disengagement preventing mechanism does not lock the cartridge unnecessarily.

4. The disengagement preventing mechanism renders the magazine more simple, inexpensive, and reliable.

What is claimed is:

1. A magazine accommodating a plurality of cartridges used in recording and reproducing apparatus, said magazine comprising:

a main body accommodating one of said cartridges, said one of said cartridges being inserted into and withdrawn from said main body;

a plurality of levers, each of said plurality of levers having a first end that is rotatably mounted to a first side of said main body, and a second end that contacts an end surface of said one of said cartridges along a direction of insertion/withdrawal of said one of said cartridges when said one of said cartridges is inserted into said main body;

a plurality of springs, each of said plurality of springs having a first end connected to a respective said first end of each of said plurality of levers, and being adjacent to a first side surface of said one of said cartridges; and a plurality of claws, each of said plurality of claws being connected to a respective second end of each of said plurality of springs, and locking said one of said cartridges by being inserted into a concave portion on said first side surface of said one of said cartridges, when said one of said cartridges is inserted into said main body.

2. A magazine accommodating a plurality of cartridges used in recording and reproducing apparatus as claimed in claim 1, wherein each of said plurality of springs is a leaf spring.

3. A magazine accommodating a plurality of cartridges used in recording and reproducing apparatus as claimed in claim 1, wherein each of said plurality of claws has an inclined surface and a nearly perpendicular surface, with respect to said direction of insertion/withdrawal.

4. A magazine accommodating a plurality of cartridges used in recording and reproducing apparatus as claimed in claim 1, wherein each of said plurality of levers, each of said plurality of springs, and each of said plurality of claws are integrally made of synthetic resin.

5. A magazine accommodating a plurality of cartridges used in recording and reproducing apparatus as claimed in claim 1, wherein each of said plurality of levers, each of said plurality of springs, and each of said plurality of claws are mounted on the first side and a second side of said main body, another concave portion being on a second side surface of said one of said cartridges.

6. A magazine accommodating a plurality of cartridges used in magnetic recording tape apparatus library, said magazine comprising:

a main body accommodating one of said cartridges, said one of said cartridges being inserted into and withdrawn from said main body;

a plurality of levers, each of said plurality of levers having a first end that is rotatably mounted to a first side of said main body, and a second end that contacts an end surface of said one of said cartridges along a direction of insertion/withdrawal of said one of said cartridges when said one of said cartridges is inserted into said main body;

a plurality of springs, each of said plurality of springs having a first end connected to a respective said first end of each of said plurality of levers, and being adjacent to a first side surface of said one of said cartridges; and a plurality of claws, each of said plurality of claws being connected to a respective second end of each of said plurality of springs, and locking said one of said cartridges by being inserted into a concave portion on said first side surface of said one of said cartridges, when said one of said cartridges is inserted into said main body.

7. A magazine accommodating a plurality of cartridges used in magnetic recording tape apparatus library as claimed in claim 6, wherein each of said plurality of springs is a leaf spring.

8. A magazine accommodating a plurality of cartridges used in magnetic recording tape apparatus library as claimed in claim 6, wherein each of said plurality of claws has an inclined surface and a nearly perpendicular surface, with respect to said direction of insertion/withdrawal.

9. A magazine accommodating a plurality of cartridges used in magnetic recording tape apparatus library as claimed in claim 6, wherein each of said plurality of levers, each of said plurality of springs, and each of said plurality of claws are integrally made of synthetic resin.

10. A magazine accommodating a plurality of cartridges used in magnetic recording tape apparatus library as claimed in claim 6, wherein each of said plurality of levers, each of said plurality of springs, and each of said plurality of claws are mounted on the first side and a second side of said main body, another concave portion being on a second side surface of said one of said cartridges.

* * * * *